(12) United States Patent
Farringdon et al.

(10) Patent No.: US 6,496,116 B2
(45) Date of Patent: Dec. 17, 2002

(54) LOCATION ALARM

(75) Inventors: Jonathan Farringdon, Penshurst (GB); Leonard H. Poll, Redhill (GB); Armando S. Valdes, Orpington (GB)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

This patent is subject to a terminal disclaimer.

(21) Appl. No.: 10/090,174

(22) Filed: Mar. 4, 2002

(65) Prior Publication Data

US 2002/0089421 A1 Jul. 11, 2002

Related U.S. Application Data

(63) Continuation of application No. 09/747,111, filed on Dec. 21, 2000.

(30) Foreign Application Priority Data

Dec. 23, 1999 (GB) .............................................. 9930645

(51) Int. Cl.⁷ .............................................. G08B 23/00
(52) U.S. Cl. ...................................... 340/573.1; 701/211
(58) Field of Search ............................ 340/573.1, 944, 340/995, 996, 825.36, 825.49; 701/211, 213

(56) References Cited

U.S. PATENT DOCUMENTS

| | | | |
|---|---|---|---|
| 5,699,244 A | 12/1997 | Clark, Jr. et al. | 702/2 |
| 5,797,091 A | 8/1998 | Clise et al. | 455/404 |
| 5,938,721 A | 8/1999 | Dussell et al. | 701/211 |
| 5,964,821 A | 10/1999 | Brunts et al. | 701/201 |
| 6,222,482 B1 | 4/2001 | Gueziec | 342/357.08 |
| 6,392,548 B2 * | 5/2002 | Farringdon et al. | 340/573.1 |

FOREIGN PATENT DOCUMENTS

| | | | |
|---|---|---|---|
| EP | 1008946 A1 | 6/2000 | G06F/17/60 |
| JP | 9113599 | 5/1997 | G01S/5/14 |
| JP | 11108685 | 4/1999 | G01C/21/00 |
| JP | 311145 A | 7/2000 | |
| WO | WO9700492 | 1/1997 | G06F/153/00 |
| WO | WO9847295 | 10/1998 | H04Q/3/00 |
| WO | WO0007392 | 2/2000 | H04Q/7/22 |

OTHER PUBLICATIONS

N.J. Newman et al., "A Wearable Application Integration Framework", Third International Symposium of Wearable Computers, Oct. 199, San Francisco, CA—Gadget Show.
A.E. Fano, "Using Location–Based Filtering For a Shopping Agent in the Physical World", pp. 416–421.

* cited by examiner

*Primary Examiner*—John Tweel
(74) *Attorney, Agent, or Firm*—Gregory L. Thorne

(57) ABSTRACT

A portable location alarm device is provided which allows a user to preset an alarm event to occur when the device arrives at a pre-determined location. The alarm event alerts the user by audible, visual or vibrating means. The alarm device determines it's actual location using GPS data. In one embodiment the user bookmarks particular locations while physically present at a given location. Part of the bookmarking process involves the device simultaneously receiving GPS data that describes the physical location. The user can subsequently set an alarm event for any bookmarked location without the need for the device to carry large databases, for example of the type cross-referencing place names to mapping co-ordinates.

39 Claims, 1 Drawing Sheet

LOCATION ALARM

CROSS REFERENCE TO RELATED APPLICATIONS

This is a continuation divisional of application Ser. No. 09/747,111, filed Dec. 21, 2000

FIELD OF THE INVENTION

The present invention relates to a method and apparatus for producing an alarm signal in mobile equipment, and in particular to such a method and apparatus for producing an alarm signal in consumer electronics devices.

BACKGROUND OF THE INVENTION

It is known to provide mobile terminals, such as personal digital assistants (PDA's) with a time scheduling function. By including a calendar and clock in the mobile terminal, together with an alarm facility, a user of the terminal is able to set in advance a date and time for which an alarm should be generated.

While such temporal alarms are useful, a person may need to perform certain tasks that are preferably or even necessarily executed at particular locations. One example of such a task might be when a person is requested by a friend to obtain some information from a local theatre next time they visit it. Assume the person occasionally visits the theatre, although not on a regular basis. Since the person visits the place at irregular times, setting a temporal alarm for such a task is of limited value. Such a temporal alarm can only remind a user that they need to visit the location (theatre) to perform the task. In some instances a user may have recently visited a location where they needed to perform a particular task, but failed to perform the task because they forgot to. They may have even set a temporal alarm to remind them of the task, but if the alarm is generated after the person has departed from the location it is too late to be of benefit.

The paper entitled 'Shopper's Eye: Using location—based filtering for a shopping agent in the physical world', from Proceedings of the Second International Conference on Autonomous Agents, Minneapolis, Minn., USA 9—13 May 1998 (Proceedings of the Second International Conference on Autonomous Agents, pp. 416–421), introduces 'Shopper's Eye', a PDA-based, Global Positioning System (GPS)—enabled agent prototype that relies on knowledge of a shopper's physical location to support the shopping task while shopping in a mall. While at home, shoppers create a shopping list of items by selecting items from a pre-existing set of product categories and also indicate the shopping venue that they intend to visit by selecting a venue from a list of shopping malls. Upon arriving at the mall, 'Shoppers Eye' begins by suggesting the closest store that sells at least one item that is on the shopping list of the user. 'Shoppers Eye' is an example of 'location based filtering'—exploiting the user's location to constrain the task of an agent.

In order for the 'Shoppers Eye' to perform satisfactorily, it is necessary to provide a database which includes information about how the particular shopping mall is designed, which shops are present in the mall, where those shops are in the mall and which shops sell which products. Only when all of this information is available can the correct filtering be applied to the agent. Furthermore, information will need to be updated on a regular basis for it to be of use, especially the information relating to products sold by the shops. Clearly, a large amount of information needs to be stored in the database which is more likely to be built up and maintained commercially than by an individual user. Indeed, unless a venue is listed in the database, Shoppers Eye will not be of assistance.

It will therefore be seen that the concept behind 'Shoppers Eye' will not provide any assistance to the person noted in the theatre scenario above. Firstly, it is unlikely that a small local theatre will be in a relatively localised area such as a shopping mall and so is unlikely to appear on the database for selection. Secondly, the user of 'Shoppers Eye' is primarily concerned with the main task of shopping and as a result of this, the user engages in a conscious act of preparing 'Shoppers Eye' prior to embarking on the task of shopping itself—the person knows that they will be in a particular shopping mall in the immediate future. In contrast, the person visiting the theatre will be looking forward to enjoying a performance and the main objective of the visit is not of gathering the information requested by his friend some weeks before. As a result of this the person will not necessarily engage in a conscious preparation of listing all the things that they need to do at the theatre immediately prior to actually visiting it. There are a limited number of things one wants to do at a theatre and to employ the equivalent of 'Shoppers Eye' for every task for a variety of activities that a user is likely to perform is an unattractive one.

SUMMARY OF THE INVENTION

In accordance with a first aspect of the present invention there is provided a location alarm apparatus comprising:
  alarm setting means allowing a user to specify one or more alarm locations;
  storage means for storing data defining the specified alarm locations;
  location establishing means for determining the current location of the apparatus; and
  output signal generating means for generating an output signal when the condition is met that the current location is substantially the same as a specified alarm location.

Preferably, the location establishing means includes means for processing Global Positioning System information.

Optionally, the alarm setting means allows the user to specify an alarm location which corresponds to the current location as determined by the location establishing means. This feature allows the user of the location alarm, when situated at a particular location, to simply set the apparatus to produce an output signal on the occurrence of a subsequent visit to that particular location. Advantageously, because information describing the physical location is derived from the location establishing means, there is no requirement for the user to input such information. Hence, there is no requirement for the user to have any knowledge of where they are in terms of physical geographic location as may normally be described, for example, with reference to navigational co-ordinates or the like. A further advantage is that because the user can specify the alarm location without making any reference to such a physical geographic co-ordinate system, there is no need for the user to be provided with access to a map or the like, either in the form of a paper map or a map stored electronically.

The location alarm apparatus may further be provided with specified alarm location recording means for maintaining a record of previously specified alarm locations. This allows previously specified alarm locations to be recalled by the user and re-set as specified alarm locations once more.

Hence, once an alarm location has been specified and the corresponding information describing the associated physical location is known, the user can re-set a specified alarm location even when they are at a physical location that does not correspond with the physical location of the re-set alarm location.

The location alarm apparatus may allow for the association of supplementary information with the or each specified alarm location. This information may also be used for specifying alarm locations during the alarm setting process.

Where supplementary information is associated with a specified alarm location, on the condition being met that the current location is substantially the same as a specified alarm location, the output signal generating means may generate an output signal of a type dependent on the supplementary information associated with the said specified alarm location.

Where supplementary information is associated with a specified alarm location, on the condition being met that the current location is substantially the same as the specified alarm location, at least part of the supplementary information associated with the said specified alarm location may be reproduced.

Where the alarm setting means allows the user to specify an alarm location in terms of an item of data, this data may include navigational co-ordinates, a place name or mapping symbols donating the presence of physical objects.

In accordance with another aspect of the present invention there is provided a method of generating a location dependent alarm output signal in a device comprising the steps of:

specifying one or more locations for which an output signal should be generated;

establishing the current location of the device; and generating the output signal when the current location is substantially the same as a specified location.

Other aspects and optional features of the present invention appear in the appended claims, to which reference should now be made and the disclosure of which is incorporated herein by reference.

BRIEF DESCRIPTION OF THE DRAWINGS

Embodiments of the present invention will now be described by way of example only with reference to the accompanying drawings in which.

DETAILED DESCRIPTION OF THE INVENTION

Figure 1:
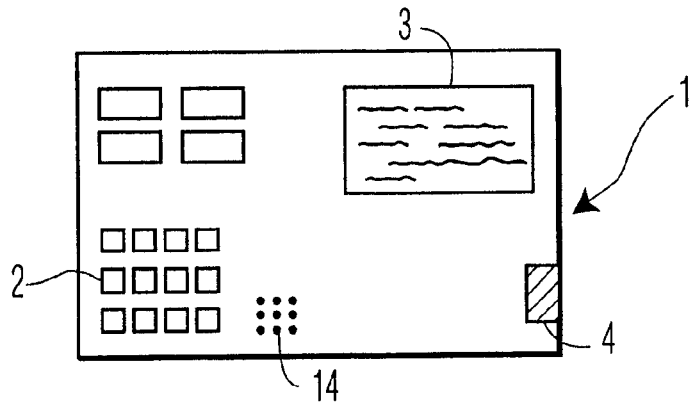
FIG. 1 is a schematic representation of one implementation of the location alarm apparatus of the present invention.
Figure 2:
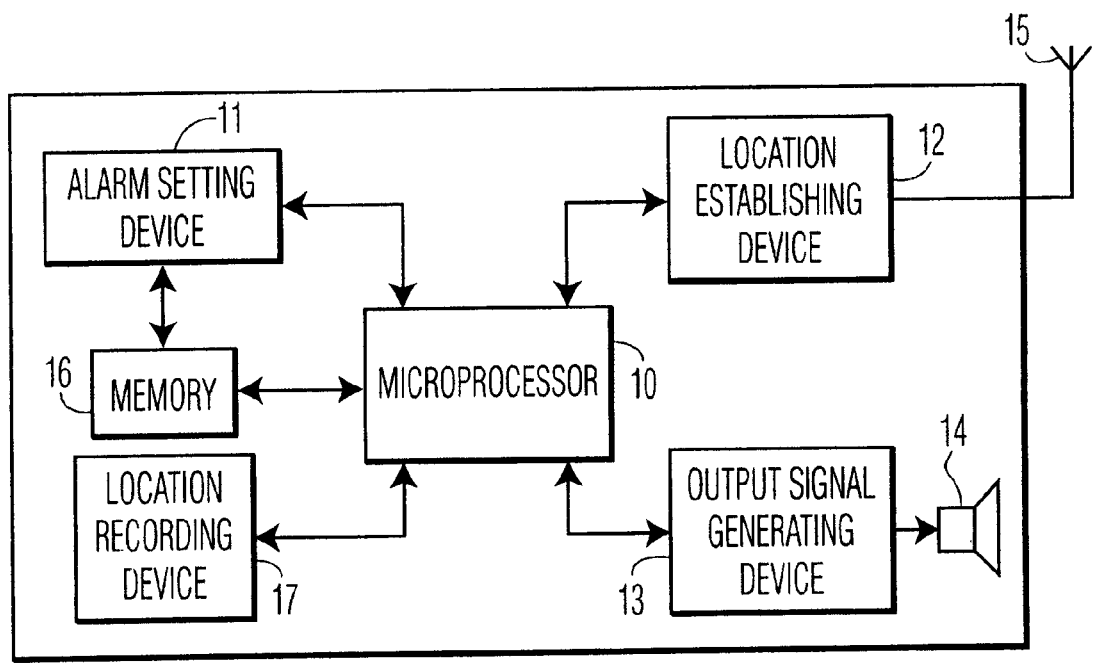
FIG. 2 is a schematic representation of functional components of the location alarm of the present invention.

Referring to the Figures, a mobile location alarm apparatus is provided in the form of alarm device 1 which is of a size and weight suitable for being carried on the person or in personal luggage. The device 1 is provided with a keypad 2 allowing the user to input information necessary to use the device. The device 1 is also provided with a display 3 which is used to display information that assists the user during use but which may also display information on the occurrence of an alarm event.

The main functional components include a microprocessor 10, an alarm setting means 11 which represents items necessary to set an alarm location, a location establishing means 12 for determining the current location of the device 1 and an output signal generating means 13, which generates an alarm output signal when an alarm event occurs; that is when the device is determined to be at a location for which an alarm location is set. The output signal is used to drive an annunciation device, in this case a speaker 14. However, the user can be alerted to the occurrence of an alarm event by using the alarm output signal to drive a vibrating device mounted in the alarm device 1, a visual indicator such as an LED, to generate a message in the display 3 or a suitable combination thereof. Indeed, the user may be alerted to the occurrence of an alarm event in any suitable manner.

The location establishing means 12 establishes the current, actual location of the device 1 by processing Global Positioning System (GPS) information. Such information is broadcast by GPS satellites and the information is received by antenna 15.

When the user wishes to set an alarm location, that is, a location for which they want an alarm event to occur, there are a number of methods for specifying such alarm locations. One preferred method is to set the alarm while the device is actually present at the location for which the alarm event is required. This allows information describing the physical location of the specified alarm location to be obtained directly from the location establishing means 12 and stored in a storage means in the form of memory 16. The user initiates this process by means of the keypad 2. This method has the advantage that an alarm location may be specified very easily merely by being present at a location and indicating to the device that an alarm event should be set for that location by, for example, simply pressing a button marked 'set'.

Once the device moves away from the specified alarm location for which the alarm event is required, the device becomes enabled—that is the alarm becomes "set" for that location. The enabling process may be automatic or manually activated by the user. When the device 1 subsequently returns to the specified alarm location for which the alarm is set the current location matches the physical location of the specified alarm location causing the output signal to be generated. A location alarm event thus occurs.

The above described process of setting the alarm provides particular advantages. The user of the alarm can set an alarm event for a specified alarm location merely by being at the physical location of the specified alarm location. The user does not need to input any information describing to the device where the required specified alarm location is physically. The user just instructs the device to obtain that physical location information from the location establishing means 12. In one example implementation the user indicates that an alarm event should be set for that location simply by pressing a button marked 'set'.

Thus, the user requires no knowledge in terms of navigational co-ordinates or the like of where he is situated for the purpose of setting the location alarm since he is not required to input such physical location information. Another advantage of this system is that it is unnecessary for the alarm device 1 to store large databases of information cross referencing co-ordinates with maps or place names or the like merely in order for the user to refer to such a map or place name when setting an alarm event.

In order to avoid the user needing to physically re-visit a specified alarm location every time they want to set an alarm event for that location, location device 1 may be provided with specified alarm location recording means 17 which retains information relating to each specified alarm location including the data defining the physical location. Once the user has physically visited a location and set an alarm event for that location once, they can set further alarm events for that same location by recalling information stored in the alarm location recording means 17. Indeed, by use of the keypad 2 (or other input means), the user may instruct the location recording means 17 to take a record of the current location, which record includes information obtained from the location establishing means 12 describing the physical location, but without actually committing the current location to becoming a set alarm location. In this way the user of the device can roam around gathering physical location information of locations of interest to build up a set of 'location bookmarks', without actually setting an alarm event for these locations. After a period of such activity the user will have effectively built a library of specific alarm locations and the user can subsequently access this information at will for setting an alarm event.

Each specified alarm location may be provided with associated information (in addition to that describing the physical location). One type of associated information is a text string that may be used to identify an alarm location. For example, for a specified alarm location having a physical location situated in the theatre, an associated text string is added by the user to spell the word 'Theatre', which may be presented by the display accordingly. A user wishing to set an alarm event to occur when next visiting the theatre is then able to interrogate the contents of the location recording means 17 until they find the specified alarm location having the associated identity information 'Theatre'.

A simple user interface provided by the interaction of the keypad 2 and display 3 allows the user to specify alarm locations, associate text strings with those locations and subsequently scroll through a list of recorded alarm locations by identity or otherwise, to set an alarm event for one or more of those stored locations.

For a given specified alarm location the associated information may be reproduced on the occurrence of an alarm event. Taking the above example of a location alarm set with a specified alarm location of the theatre, a subsequent visit to the theatre will trigger the occurrence of an alarm event. On occurrence of this alarm event the word 'Theatre' appears in the display 3.

The information associated with a specified alarm location may be more comprehensive. In the case of the above example, on the occurrence of the said alarm event the display presents a message that reminds the user of what they need to do while at the theatre, for example, to enquire about a forthcoming production. The message would have been input by the user at the time of setting the alarm event, or may be appended to the set alarm event some time later.

The device 1 allows the user to take a number of specified alarm locations and give them a common identity. One example would be where there are several alarm locations each corresponding to a chemists shop. If the user of the device is not concerned with visiting a specific chemists shop then he can set the device to generate an alarm event the next time he is at any one of the chemists shops. By grouping a number of such alarm locations together, a generic alarm location type may be defined giving the group an identity. An alarm event may be set in terms of this identity. A subsequent visit to any of the alarm locations belonging to that group may then produce an alarm whereby information associated with the group identity rather than the specific alarm location is displayed.

It is possible to select the type of alert produced by the device on the occurrence of an alarm event. The type of alert can be chosen at the time of setting the alarm or can be associated with the specified alarm location (or generic alarm location) itself. For example, should the user wish to set an alarm event for a specified alarm location which is physically located in a noisy place, they may prefer to be alerted using the visual alert or the vibrating device. Thus the type of alert can be chosen to be appropriate to the context.

A second method of setting the location alarm is to specify the alarm location with reference to a database. Such a database may contain place names or a representation of a map, and the user sets the alarm by specifying an alarm location with reference to the database. The database is interrogated to obtain information describing the physical location of the selected place name or position selected on the map. This allows an alarm to be set for a particular location without the need to have ever physically visited the location. Where the database contains a representation of a map, an alarm location may be specified in terms of features of the map. An example would be the selection of a symbol on a map showing the location of a public telephone to set an alarm event that will occur when the device is next in the vicinity of a public telephone. The database may be integrated to the device 1 or held on supplementary storage means such as a ROM, magnetic disc, solid state 'flash' memory, optical disk or the like, which is accommodated in a socket 4 of the device 1. Alternatively, the database may be held remotely on a server and accessed on demand over a wired or wireless interface. Each specified alarm location may be provided with associated information as described above.

It will be apparent to the person skilled in the art that it is permissible for an alarm event to occur even when there is a discrepancy between the determined current location of the device 1 and the physical location of the specified alarm location. This means that an alarm event may occur when a user is near a particular specified alarm location but not exactly at that location. Indeed, the user may specify a tolerance on an individual basis for each specified alarm location.

Preferably, the device establishes its location using GPS data. However, the present invention is not solely restricted to obtaining the current location information in this manner and other suitable methods may be employed, as will be apparent to the person skilled in the art.

One other way in which a device could establish its location would be through the reception of transmissions originating from base stations of a mobile cellular telephone system. Transmissions received from a base station indicate to the device that it is reasonably near to the base station. Transmissions may be received from more than one base station simultaneously and by using triangulation techniques to process the received transmissions it should be possible to establish the position of a device with an accuracy in the order of a few metres to a few tens of metres.

Although the present invention has been described as a discrete device, the location alarm apparatus may be incorporated in a mobile communications terminal such as a mobile telephone, in a personal digital assistant or used with wearable computer apparatus. In these circumstances the location alarm apparatus may communicate and exchange data with such equipment during normal operation. For example a GPS enabled personal digital assistant would provide the location alarm apparatus with information relating to the current location, which may be GPS data or processed location information.

Furthermore, the user may input information describing the physical location of a specified alarm location in other ways, as will be apparent to the person skilled in the art. For example, if the user has access to navigational or mapping co-ordinates, they may be input directly using the keypad 2. In any case, the keypad is representative of an input device and as such other variations or alternatives may be provided. Where a keypad is maintained, it could be provided in the form of a full alpha-numeric keypad or in the form of just several buttons.

Other variations include, for example, where the output signal generating means may produce an output signal capable of triggering an event. Such events include presentation of a news feature, reproduction of music or some other event. It is also possible to stipulate that in order for the output signal generating means to generate an output signal, further criteria must be fulfilled together with the requirement that the current location is substantially the same as the specified alarm location. For example, when the current location is substantially the same as a specified alarm location, an output signal will only be generated on particular days of the week, or within a certain time of day. It is envisaged that where the user activity can also be established, for example whether the user is walking, driving, sitting at a desk and so forth, the presently established activity of the user may also be used in determining whether an output signal will be generated.

From reading the present disclosure other modifications will be apparent to the person skilled in the art. Such modifications may involve other features which are already known in the design, manufacture and use of systems and devices and component parts thereof and which may be used instead of or in addition to features already described herein.

What is claimed is:

1. A location alarm apparatus comprising:
   alarm setting means allowing a user to specify one or more alarm locations by a common identity;
   storage means for storing data defining the specified alarm locations and for storing other data specifying a task;
   location establishing means for determining the current location of the apparatus; and
   output signal generating means for generating an output signal corresponding to at least one of conditions surrounding the current location and the specified task when the condition is met that the current location is substantially the same as a specified alarm location and the common identity of the specified alarm location is associated with the specified task.

2. A location alarm apparatus in accordance with claim 1 wherein the location establishing means includes means for obtaining and processing Global Positioning System information.

3. A location alarm apparatus in accordance with claim 2 wherein the location establishing means further comprises receiving means for receiving data transmitted by satellites according to the Global Positioning System.

4. A location alarm apparatus in accordance with claim 1, wherein the alarm setting means allows the user to specify an alarm location which corresponds to the current location as determined by the location establishing means.

5. A location alarm apparatus in accordance with claim 1 and further comprising specified alarm location recording means for maintaining a record of previously specified alarm locations.

6. A location alarm apparatus in accordance with claim 5, wherein the alarm setting means allows the user to specify an alarm location selected from the record of previously specified alarm locations.

7. A location alarm apparatus in accordance with claim 1 and further comprising means for associating supplementary information with a specified alarm location.

8. A location alarm apparatus in accordance with claim 7 wherein the alarm setting means allows the user to specify an alarm location selected from the record of previously specified alarm locations, and further wherein the alarm setting means allows the user to specify one or more alarm locations in terms of the associated supplementary information.

9. A location alarm apparatus in accordance with claim 7 wherein, on the condition being met that the current location is substantially the same as a specified alarm location, the output signal generating means generates an output signal of a type dependent on the supplementary information associated with the said specified alarm location.

10. A location alarm apparatus in accordance with claim 7, wherein, on the condition being met that the current location is substantially the same as a specified alarm location, at least part of the supplementary information associated with the said specified alarm location is reproduced.

11. A location alarm apparatus in accordance with claim 1 and further comprising database means which relates items of data with one or more locations.

12. A location alarm apparatus in accordance with claim 11 wherein the alarm setting means allows the user to specify an alarm location in terms of an item of data.

13. A location alarm apparatus in accordance with claim 12 wherein the data includes navigational co-ordinates.

14. A location alarm apparatus in accordance with claim 12 wherein the data includes a place name.

15. A location alarm apparatus in accordance with claim 12 wherein the data includes mapping symbols denoting the presence of physical objects.

16. A mobile communications terminal including the location alarm apparatus of claim 1.

17. A personal digital assistant having the location alarm apparatus of claim 1.

18. An interactive electronic device having the location alarm apparatus of claim 1.

19. Wearable electronic computer apparatus having the location alarm apparatus of claim 1.

20. A method of generating a location dependent alarm output signal in a device comprising the steps of:
    specifying one or more locations by one or more common identities for which an output signal should be generated;
    specifying a task associated with at least one common identity;
    establishing the current location of the device; and
    generating the output signal corresponding to at least one of conditions surrounding the current location and the specified task when the current location is substantially the same as a specified location and the common identity of the specified location is associated with the specified task.

21. The method of claim 20, wherein the step of establishing the current location of the device further comprises receiving data transmitted by satellites according to the Global Positioning System.

22. The method of claim 21, further comprising the step of associating supplementary information with a specified alarm location.

23. The method of claim 22, further comprising the step of specifying one or more alarm locations in terms of the associated supplementary information.

24. The method of claim 22, wherein, on the condition being met that the current location is substantially the same as a specified alarm location, further comprising the step of generating an output signal of a type dependent on the supplementary information associated with the said specified alarm location.

25. The method of claim 22, wherein, on the condition being met that the current location is substantially the same as a specified alarm location, comprising the step of reproducing at least part of the supplementary information associated with the said specified alarm location.

26. A location alarm apparatus comprising:
   alarm setting input configured to allow a user to specify a plurality of alarm locations by a common identity;
   a memory configured to store data defining the specified alarm locations and for storing other data specifying a task;
   location establishing device configured to determine the current location of the apparatus; and
   signal output configured to generate an output signal when the condition is met that the current location is substantially the same as a specified alarm location and the common identity of the specified alarm location is associated with the specified task.

27. The location alarm apparatus of claim 26, wherein the location establishing device comprises a receiver configured to receive and process Global Positioning System information.

28. The location alarm apparatus of claim 27 wherein the location establishing device is configured to receive data transmitted by satellites according to the Global Positioning System.

29. The location alarm apparatus of claim 26, wherein the alarm setting input is configured to allow the user to specify an alarm location which corresponds to the current location as determined by the location establishing device.

30. The location alarm apparatus of claim 26, wherein the memory is configured to maintain a record of previously specified alarm locations.

31. The location alarm apparatus of claim 30, wherein the alarm setting input is configured to allow the user to specify an alarm location selected from the record of previously specified alarm locations.

32. The location alarm apparatus of claim 26, wherein the memory is configured to associate supplementary information with a specified alarm location.

33. The location alarm apparatus of claim 32, wherein the alarm setting input is configured to allow the user to specify an alarm location selected from the record of previously specified alarm locations, and further wherein the alarm setting input is configured to allow the user to specify one or more alarm locations in terms of the associated supplementary information.

34. The location alarm apparatus of claim 32, wherein, on the condition being met that the current location is substantially the same as a specified alarm location, the signal output is configured to generate an output signal of a type dependent on the supplementary information associated with the said specified alarm location.

35. The location alarm apparatus of claim 32, wherein, on the condition being met that the current location is substantially the same as a specified alarm location, the location alarm apparatus is configured to reproduce at least part of the supplementary information associated with the said specified alarm location.

36. A mobile communications terminal including the location alarm apparatus of claim 26.

37. A personal digital assistant having the location alarm apparatus of claim 26.

38. An interactive electronic device having the location alarm apparatus of claim 26.

39. Wearable electronic computer apparatus having the location alarm apparatus of claim 26.

* * * * *